(12) United States Patent
Westaby

(10) Patent No.: US 8,919,572 B1
(45) Date of Patent: Dec. 30, 2014

(54) FILTER APPARATUS FOR A SLURRY TANK

(76) Inventor: Jesse Westaby, Alexander, IA (US)

( * ) Notice: Subject to any disclaimer, the term of this patent is extended or adjusted under 35 U.S.C. 154(b) by 380 days.

(21) Appl. No.: 13/068,472

(22) Filed: May 12, 2011

(51) Int. Cl.
    *B01D 35/28* (2006.01)
    *B01D 35/00* (2006.01)

(52) U.S. Cl.
    USPC ............... 210/448; 210/167.18; 210/167.19; 210/172.1; 210/172.6; 210/237; 210/241; 239/663; 239/662; 239/681; 239/688

(58) Field of Classification Search
    USPC .......... 210/448, 167.18, 167.19, 170.04, 171, 210/172.1, 172.2, 172.4, 172.5, 172.6, 235, 210/237, 241, 244, 264, 205, 202, 455, 477, 210/484, 485; 239/663, 662, 681, 688
See application file for complete search history.

(56) References Cited

U.S. PATENT DOCUMENTS

| 4,189,386 | A | * | 2/1980 | Aman | ................... | 210/235 |
| 4,871,454 | A | * | 10/1989 | Lott | ................... | 210/205 |
| 7,823,807 | B1 | * | 11/2010 | Bauer | ................... | 239/688 |

\* cited by examiner

*Primary Examiner* — Nam Nguyen
*Assistant Examiner* — Madeline Gonzalez
(74) *Attorney, Agent, or Firm* — G. Brian Pingel; David M. Breiner; Camille L. Urban

(57) ABSTRACT

A filter basket apparatus that filters a slurry stream as the slurry stream is being pumped into a slurry tank. The filter basket apparatus includes a filter basket pivotably coupled to the tank so that the basket can be selectively inserted into an inlet in the slurry tank and extracted from the inlet and dumped to remove collected foreign material. The filter basket includes one or more portions of a lower wall that includes one set of substantially parallel grate members.

18 Claims, 6 Drawing Sheets

FILTER APPARATUS FOR A SLURRY TANK

BACKGROUND

Slurry tanks can be used to store any number of different types of slurry, which is a liquid mixture. For example, slurry made from livestock manure can be used to fertilize crops. Typically, manure slurry, which includes liquid manure, urine, and waste solids, is loaded into a slurry tank using a hose attached to a pump. To prevent foreign material from entering the tank and clogging the application systems and the like, filter baskets have been employed to filter the slurry as it is being loaded into the tank.

Conventional filter baskets such as disclosed in U.S. Pat. No. 7,823,807 B1 typically include mesh (which can be made from perforated sheets that form intersecting grate members, for example) that extends over a rear wall, a front wall, a lower wall and two sidewalls that, typically, were trapezoidal in shape. The mesh prevents foreign material from passing into the slurry tank. However, the mesh filter baskets tend to clog relatively frequently, thus requiring the operator to empty the filter basket frequently. Additionally, some of the foreign material and slurry can become stuck in the mesh or the squared-off bottom of the basket and must be removed by hand.

SUMMARY

This summary is provided to introduce a selection of concepts in a simplified form that are further described below in the Detailed Description. This summary is not intended to identify key features or essential features of the claimed subject matter, nor is it intended to be used, in isolation, as an aid in determining the scope of the claimed subject matter. At a high level, embodiments of the invention relate to a filter basket apparatus that filters a slurry stream as it is being pumped into a slurry tank. The filter basket apparatus includes a filter basket pivotably coupled to a set of arms such that the filter basket can be selectively inserted into an inlet in the slurry tank and extracted from the inlet and dumped. The configuration of the lower wall of the basket includes an upper portion that is simply formed of parallel aligned grate members, rather than a mesh. In various embodiments, the bottom end of the basket has a rounded configuration, rather than being squared off as in conventional filter baskets.

A first illustrative embodiment of the invention relates to an apparatus that filters a slurry stream as the slurry stream is being loaded into a slurry tank by way of an inlet on the tank. According to embodiments of the invention, the apparatus includes a basket assembly that, in a first position, is disposed substantially within an inlet frame surrounding the inlet, and, in a second position, the basket assembly is at least partially inverted. The basket assembly includes a frame and a basket. According to embodiments, the basket includes a lower wall having a first set of substantially parallel grate members. The apparatus further includes an arm assembly that movably couples the basket assembly to the inlet frame.

A second illustrative embodiment of the invention relates to a slurry application system that spreads slurry onto a surface. In embodiments, the system includes a slurry tank that is configured to store slurry. The slurry tank includes an inlet frame surrounding an inlet opening. The slurry tank is loaded by receiving slurry by way of the inlet. Embodiments of the system further include a filter apparatus that removes foreign material from the slurry. In embodiments, the filter apparatus includes a basket assembly that is movably coupled to the input frame by an arm assembly. The basket assembly can include a frame and a basket, which includes a lower wall having a first set of substantially parallel grate members. The illustrative system also includes a transportation system that allows for transporting the slurry tank.

A third illustrative embodiment of the invention relates to an apparatus that filters a slurry stream as the slurry stream is being pumped into a slurry tank having an inlet. The apparatus includes a basket assembly that, in a first position, is disposed substantially within an inlet frame surrounding the inlet and that, in a second position, is at least partially inverted. In embodiments, the basket assembly includes a frame and a basket. The basket includes a rear wall, two side walls, and a lower wall. According to various embodiments of the invention, the lower wall includes a first portion and a second portion, the first portion having a first set of substantially parallel grate members. In embodiments, the second portion can include a mesh. The apparatus further can include an arm assembly that movably couples the basket assembly to the inlet frame.

These and other aspects of the invention will become apparent to those having skill in the relevant arts upon a reading of the following description, drawings, and claims.

BRIEF DESCRIPTION OF THE DRAWINGS

Embodiments of the invention are described in detail below, with reference to the attached drawing figures, wherein.

DETAILED DESCRIPTION

The subject matter of embodiments of the invention disclosed herein is described with specificity to meet statutory requirements. However, the description itself is not intended to limit the scope of this patent. Rather, the inventors have contemplated that the claimed subject matter might also be embodied in other ways, to include different features or combinations of features similar to the features described in this document, in conjunction with other technologies.

Figure 1:
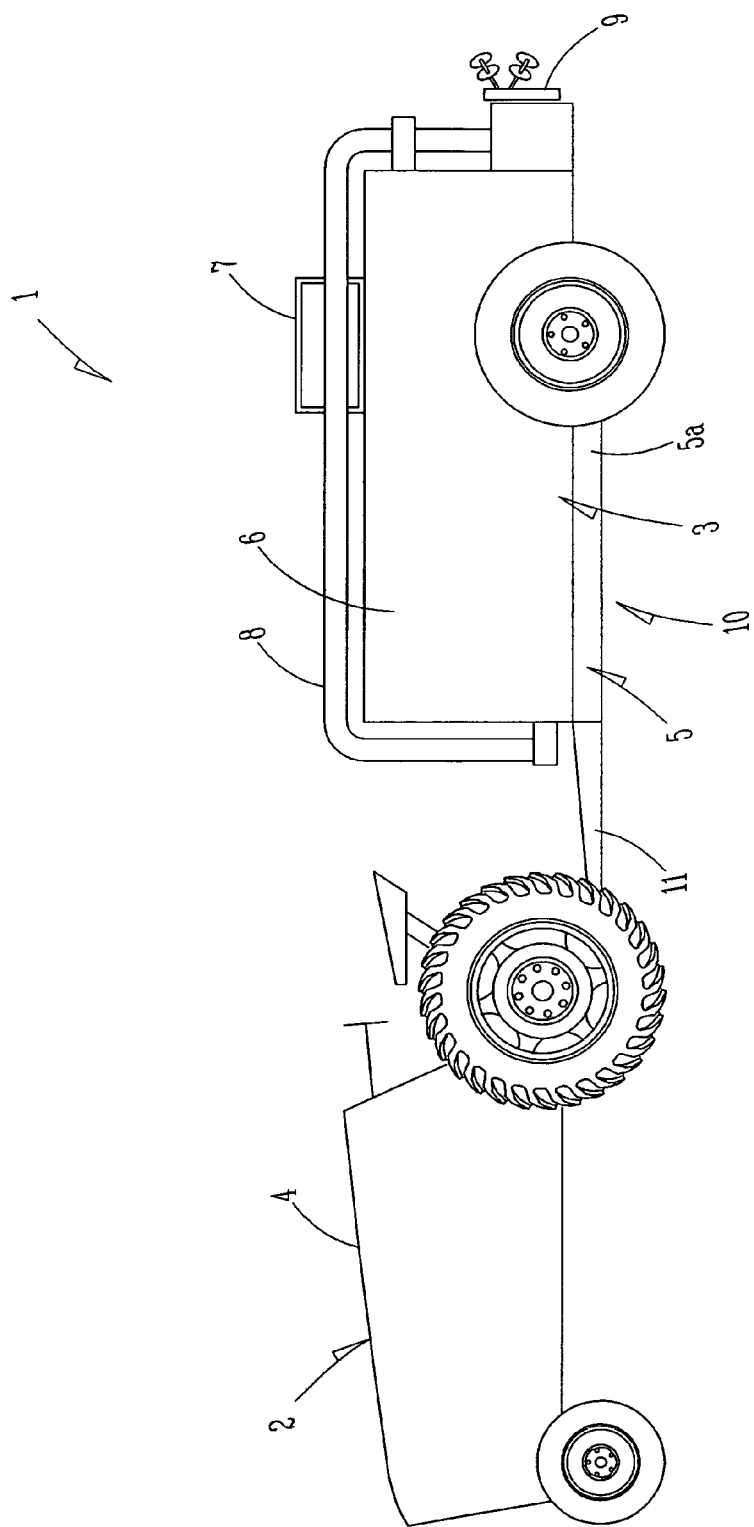
FIG. 1 is a side view of an illustrative slurry spreader in accordance with embodiments of the invention.

Referring to the drawings, and particularly to FIG. 1, there is depicted an illustrative slurry applicator 1. According to various embodiments of the invention, the slurry applicator 1 can be used for applying slurry to some surface such as the ground. In some embodiments, for example, the slurry applicator 1 can be used to apply a liquid manure slurry to a field. As depicted in FIG. 1, embodiments of the slurry applicator 1 include a transport system 2 and a slurry application system 3. In some embodiments, the transport system 2 and the slurry applications system 3 are separate vehicles, as illustrated in FIG. 1. In the illustrated embodiment, for example, the transport system 2 is a tractor 4, which tows the slurry application system 3. In other embodiments, the transport system 2 and the slurry application system 3 are integrated into a single vehicle. Any suitable configuration for transporting a slurry application system 3 is considered to be within the ambit of the invention.

As illustrated in FIG. 1, the slurry application system 3 includes a base 5 that supports a slurry tank 6, which is disposed on top of the base 5. The application system 3 includes an inlet 7 disposed on the top of the slurry tank 6, piping 8, and a tool bar 9. The base 5, as illustrated in FIG. 1, includes a frame 5A, a drive system 10 coupled to the frame 5A, and a towing connection 11. The illustrative slurry applicator 1 depicted in FIG. 1, and the corresponding disclosure herein, is not meant to limit implementations of the invention to those components, or configurations of components, illustrated. To the contrary, individuals having skill in the relevant arts will understand that the slurry applicator 1 can be configured in any number of different ways.

Figure 2:
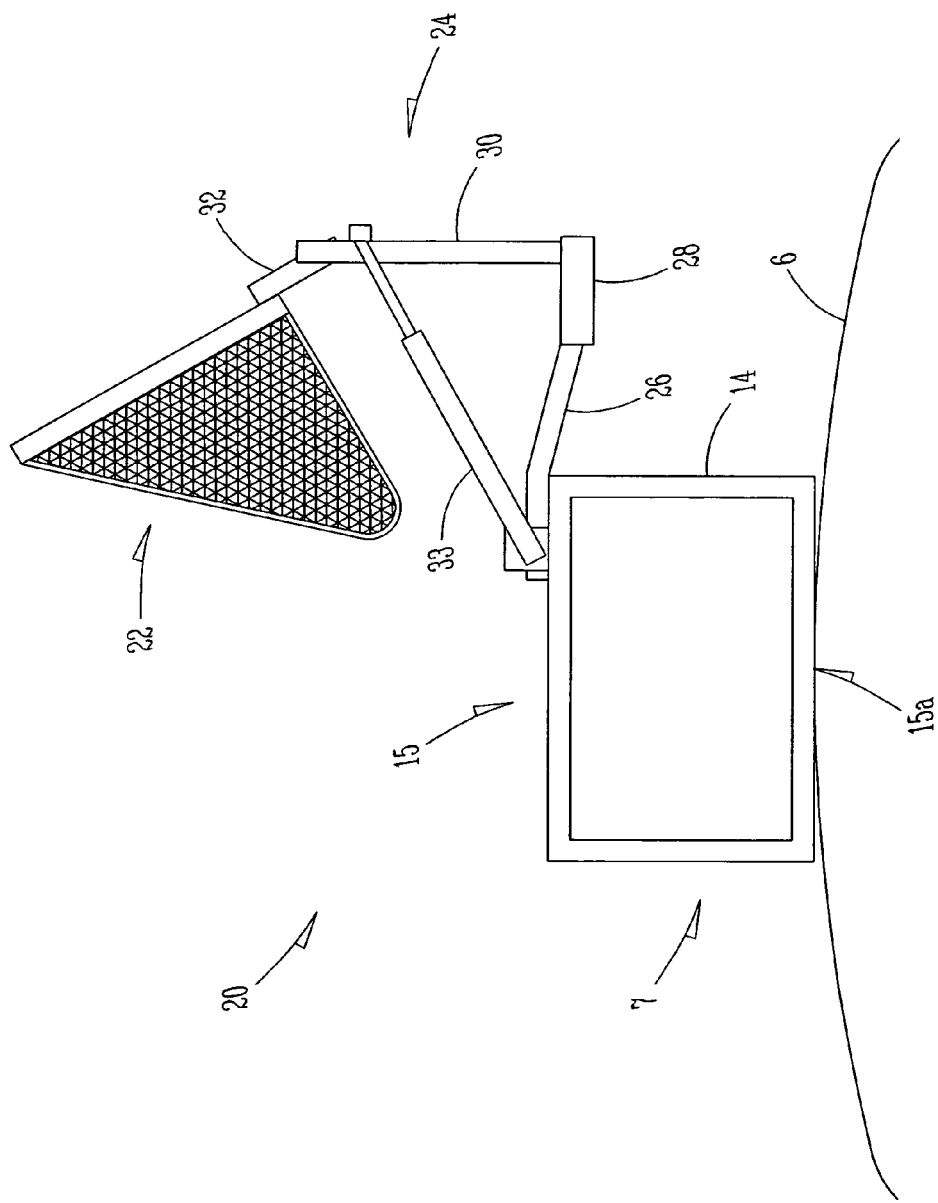
FIG. 2 is a side view of an illustrative filter apparatus coupled to a slurry tank in accordance with embodiments of the invention.
Figure 3:
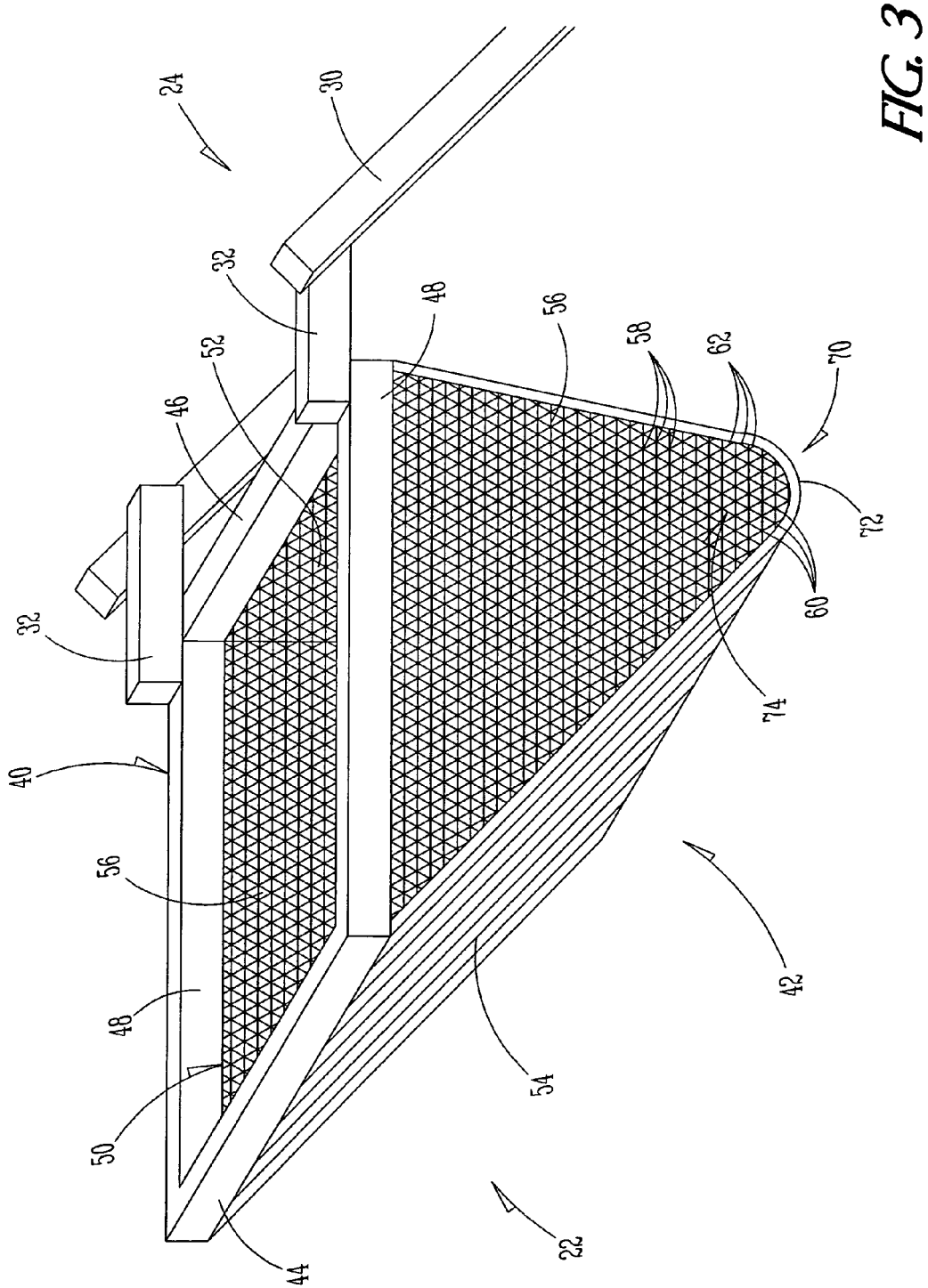
FIG. 3 is a perspective view of an illustrative basket assembly in accordance with embodiments of the invention.

Turning now to FIGS. 2 and 3, an illustrative filter apparatus 20 is depicted in accordance with embodiments of the invention. As illustrated, the filter apparatus 20 includes a basket assembly 22 and an arm assembly 24. As illustrated, the arm assembly 24 includes a pair of first arm members 26 that are each fixed, at a first respective end thereof, near the inlet 7. In some embodiments, for example, inlet 7 includes an inlet frame 14 having an opening 15 at the top. The inlet frame 14 surrounds, and provides access to, an opening 15a in the top of the slurry tank 6. The basket assembly 22 is configured to be lowered, by operation of the arm assembly 24, into the opening 15 defined by the inlet frame 14. Slurry is poured into the top of the opening 15 defined by the inlet frame 14, passes through the basket assembly 22 to remove large foreign material, and drops into the slurry tank 6 through the opening 15a in the top of the tank 6.

According to various embodiments of the invention, the inlet frame 14 can be configured in any number of suitable manners, all of which are considered to be within the ambit of the invention. For example, in some embodiments, the inlet frame 14 is a short, hollow cylindrical structure extending upward away from the opening 15a in the top of the slurry tank 6. In other embodiments, the inlet frame 14 can be configured according to any number of other various shapes. For instance, in an embodiment, the inlet frame 14 can define a rectangular or square opening 15 in the top of the frame 14 and thereby provide access to the opening 15a in the top of the slurry tank 6 (which also can be configured in any number of ways). Additional hardware and/or hardware configurations can be included in the inlet 7 such as, for example, sloped walls inside the inlet frame 14, sensors, doors for covering the openings 15 and 15a, and the like.

As indicated above, the opening 15 in the inlet 7 is configured to receive the basket assembly 22, or at least a portion thereof. Because it is desirable to allow for emptying the basket assembly 22 from time to time, the arm assembly 24 is configured to allow for selectively inserting the basket assembly 22 into the opening 15 at the top of the inlet 7 and extracting the filter basket from the opening 15. Additionally, the arm assembly 24 is configured to at least partially invert the basket assembly 22 to allow for foreign material caught in the basket assembly 22 to fall out, thereby preventing the caught foreign material from impeding the flow of slurry into the slurry tank 6. In embodiments, the operation of the arm assembly 24 can be controlled using controls (not illustrated herein for the purposes of clarity and brevity) located, for example, near the operator's seat.

With continued reference to FIG. 2, the arm assembly 24 further includes a pair of elbow members 28, each elbow member 28 being coupled, at a first end thereof, to the second end of a respective first arm member 26. In some embodiments, the elbow members 28 are fixedly attached to the second ends of the first arm members 26, respectively. In other embodiments, each elbow member 28 can be pivotably attached, at a first end thereof, to the end of the respective first arm member 26. As is further illustrated in FIG. 2, the arm assembly 24 includes a pair of second arm members 30. Each of the pair of second arm members 30 is coupled with the second end of an elbow member 28. In embodiments such as, for example, the embodiment illustrated in FIG. 2, each of the second arm members 30 is pivotably coupled with a second end of the corresponding elbow member 28.

Figure 6:
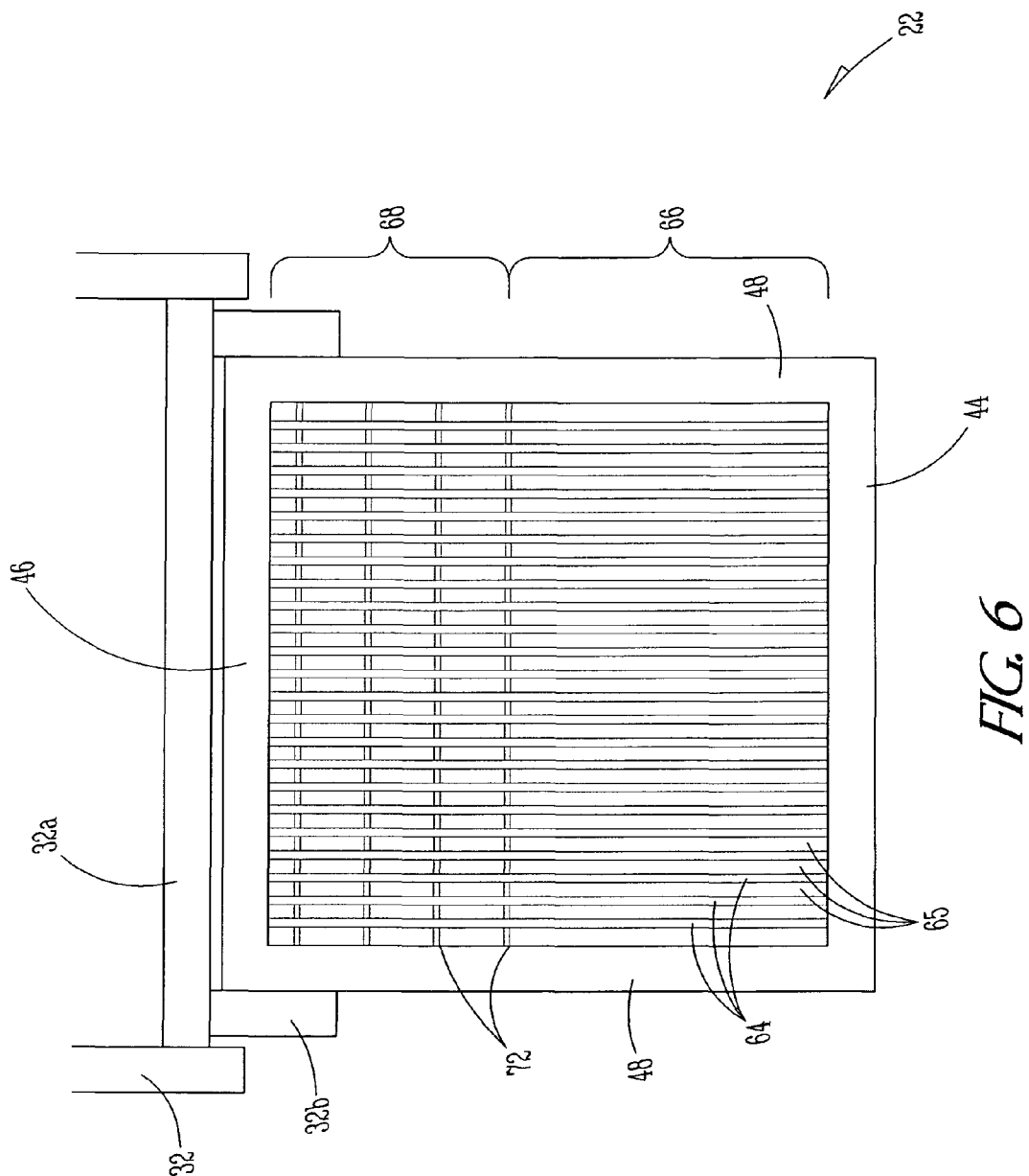
FIG. 6 is a top view of an illustrative basket assembly in accordance with embodiments of the invention.

The coupling of the first arm members 26, the elbow members 28, and the second arm members 30 allow for selectively inserting and extracting the basket assembly 22 into and from the inlet 7. In some embodiments, each second arm member 30 is pivotably coupled, at a first end thereof, to the second end of the respective elbow member 28 such as, for example, by utilizing a pivot pin 29 to couple the second arm members 30 to the elbow members 28. In other embodiments, each second arm member is fixedly attached to the second end of the elbow member 28, while the first end of the elbow member 28 is pivotably attached to a second end of each first arm member 26. A connecting member 32 is pivotably coupled to the second end of each second arm member 30 and is coupled, at its other end, to the basket assembly 22. In some embodiments such as, for example, the embodiment depicted in FIG. 6, the connecting member 32 can be a set of connecting members 32, 32a, and 32b attached together to form a frame that couples the basket assembly 22 to the arm assembly 24.

A hydraulic cylinder 33 extends generally from the inlet 7 to one of the second arm members 30. Turning briefly to FIGS. 4A and 4B, two illustrative positions 35a and 35b of the arm assembly 24 are depicted in accordance with embodiments of the invention. FIG. 4A demonstrates a first position 35a of the arm assembly 24, in which the basket assembly 22 is disposed (e.g., has been inserted into) the inlet frame 14 of the inlet 7. When the piston rod 33a of the hydraulic cylinder 33 (not illustrated in FIG. 4A for the purposes of brevity and clarity of description) is fully retracted, the basket assembly 22 is in this first position 35a, wherein the basket assembly is substantially disposed within the inlet frame 14. When the basket assembly 22 is in this first position 35a, it is configured to receive a slurry stream 35c from a loading pipe 35d. In embodiments of the invention, the loading pipe 35d can be coupled, for example, with a pump that pumps slurry into the loading pipe 35d from a slurry tank, slurry pond, or the like.

As shown in FIG. 4B, when the piston rod 33a of the hydraulic cylinder 33 is fully extended, the basket assembly 22 is in a second position 35b, in which the basket assembly 22 is at least partially inverted, allowing for foreign material caught in the basket assembly to fall out of the basket assembly 22. In some embodiments, a first end of the hydraulic cylinder 33 is pivotably coupled to the inlet frame 14, while, in other embodiments, the first end of the hydraulic cylinder 33 is pivotably coupled near the first end of a first arm member 26. Similarly, according to various embodiments, the second end of the hydraulic cylinder 33 can be pivotably coupled to any number of suitable locations. In embodiments, for example, the second end of the hydraulic cylinder 33 is pivotably coupled, at its second end, to a cross-member 33b that extends between the pair of second arm members 30 in a substantially perpendicular fashion. Depending upon desired configuration, attachment of other features, and the like, the cross member 33b can be disposed on either side of the second arm members 30, on some other structure, or the like. It should be recognized by individuals having skill in the relevant arts that any number of different configurations can be used with respect to the hydraulic cylinder and its use in selectively inserting, extracting, and dumping the basket assembly 22 as described herein with reference to various embodiments of the invention.

Turning now to FIG. 3, an illustrative basket assembly 22 is depicted in accordance with embodiments of the invention. As illustrated, the illustrative basket assembly 22 can be coupled to an arm assembly 24. As illustrated in FIG. 3, the basket assembly 22 includes a frame 40 and a basket 42. The frame 40 includes a front member 44, a rear member 46, and two side members 48 which are assembled to form a rectangular frame 40, defining an opening 50 at the top of the basket assembly 22. A basket 42 extends downward away from the frame 40 (when the filter assembly 22 is in the first position).

Figure 4:
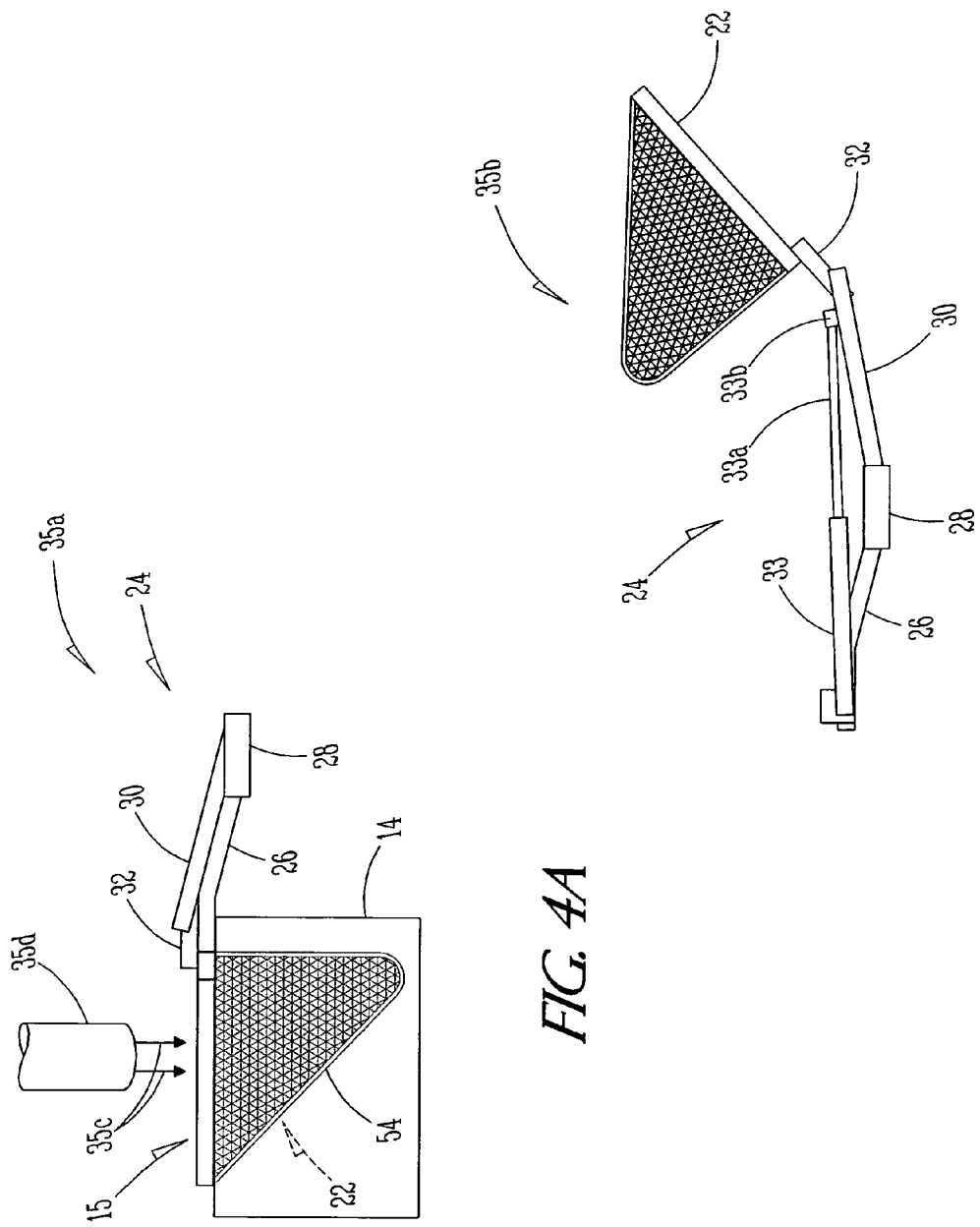
FIGS. 4A and 4B depict an illustrative filter apparatus in a first position and a second position, respectively, in accordance with embodiments of the invention.
Figure 5:
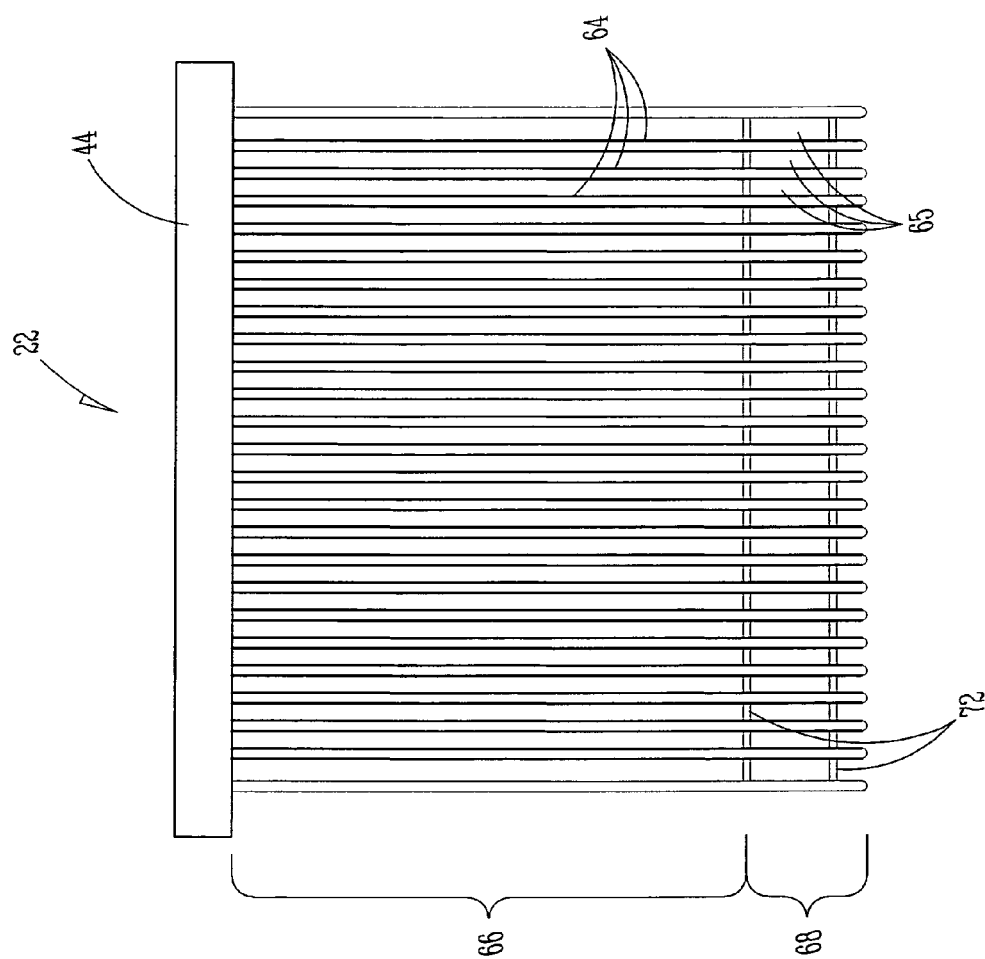
FIG. 5 is a front view of an illustrative basket assembly in accordance with embodiments of the invention.

With reference to FIGS. 3-5, the basket 42 includes a rear wall 52, a lower wall 54, and two side walls 56. In embodiments, the rear wall 52 and two side walls 56 include a mesh fashioned from some suitable material such as, for example, expanded metal. In some embodiments, the mesh can include a number of openings 58 that have any desirable shape such as, for example, triangles, rectangles, circles, and the like. The openings 58 are defined by two or more intersecting sections of grate members 60 and 62. In embodiments, one section of grate members 60 can be oriented in a generally perpendicular manner with respect to the other portion of grate members 62. In other embodiments, any number of different angles of orientation could be achieved between the different sets of grate members 60 and 62. In other embodiments, a three or more sets of intersecting grate members can intersect one another at any number of different angles so as to create the desired mesh. The mesh is configured such that larger pieces of foreign material that are suspended in the slurry passing through the basket 42 are not able to pass through the mesh.

As is further illustrated, the lower wall 54 includes at least one portion that is characterized by a single set of grate members 64, which run in a single direction, parallel to one another. The spaces 65 between the parallel grate members 64 allow for larger pieces of foreign material suspended in the slurry to pass through the basket 42 than do the openings 58 in the mesh portion of the filter basket. As discussed previously, the mesh can be effective in preventing foreign material and other undesirable objects from passing into the slurry tank. However, the smaller openings inherent in such a pattern also tend to cause the filter basket to clog relatively frequently, thus requiring the operator to empty the filter basket more often. Additionally, some of the foreign material and other materials can become stuck in the grate and must be removed by hand. As can be seen in FIG. 4A, when the slurry stream 35c is introduced to the inlet 7, the orientation of the basket assembly 22 causes most of the slurry 35c to be directed at the lower wall 54. By exposing the stream of incoming slurry 35c to a portion of the basket 42 that has larger openings between grate members that are oriented parallel to one another, the basket will become clogged less frequently, allowing the operator to continue to load the slurry tank without having to stop and empty the basket as often.

According to various embodiments, the entire lower wall 54 can be formed from the single set of grate members 64. In other embodiments, one or more portions of the lower wall 54 includes a single set of grate members, while other portions include two or more intersecting sets of grate members. For example, in embodiments illustrated in FIGS. 5 and 6, the lower wall 54 includes a first (e.g., "upper") portion 66 and a second (e.g., "lower") portion 68. The first portion 66 includes a set of parallel grate members 64, having openings 65 disposed between each pair of adjacent grate members 64.

In embodiments, the first portion defines a front wall, as shown in FIGS. 3-5, which wraps around the bottom 70 of the basket and rises part of the way up, forming a lower portion of the rear wall. The second portion 68 includes a mesh made up of two or more intersecting sets of grate members 64 and 72. For example, according to various implementations, the second grate members 72 can be spaced apart such that the resulting openings in the grate are still larger than the openings 58 in the other mesh sections. In some embodiments, the second portion 68 can be integral with the first portion 66. That is, for example, that a first set of grate members 64 can run the entire length of the lower wall 54, where, in the second portion 68, a second set of grate members 72 runs in a direction that is generally perpendicular to the first set of grate members 68.

Accordingly, in some embodiments, the basket assembly 22 can be constructed by coupling a first end of a first grate member 64 to a front member 44 of the basket frame 40 and a second end of the first grate member 64 to the rear member 46 of the frame 40 such that the first grate member 64 extends in a partially downward direction from the front member 44 and curves around, rising back up to meet the rear member 46. A number of additional grate members 64 can then be attached in a similar manner, leaving openings 65 between each pair of adjacent grate members 64. Then, perpendicular grate members 72 can be disposed across portions of the lower wall 54 created by the first set of grate members 64 to create a mesh. According to some embodiments, rather than extending the grate members 64 to the back member 46, the grate members 64 can be extended to a frame piece that extends across the bottom edge of the rear wall 52. Any other manners of configuring the filter basket such that at least a portion of the lower wall of the basket includes grate members running in only one direction are contemplated as being within the scope of the invention described herein.

In some embodiments, as shown in FIG. 3, for example, the bottom 70 includes a curved portion 72 of the lower wall 54 that forms a trough 74 in the bottom of the basket. In conventional systems, the bottom of the basket typically is squared off (e.g., that is, the lower wall 54 abuts a bottom wall at an angle and the bottom wall abuts the rear wall, forming an angular bottom of the basket). Although this configuration helped to prevent foreign material from passing through the filter basket, the foreign material often become stuck because of the angular nature of the bottom of the basket. Having a curved bottom 70 allows for foreign material to more readily roll or slide out of the bottom of the basket during a basket-dumping operation.

The present invention has been described in relation to particular embodiments, which are intended in all respects to be illustrative rather than restrictive. Alternative embodiments will become apparent to those having skill in the art to which the invention pertains, without departing from its scope.

From the foregoing, it will be seen that this invention is one well-adapted to attain all the ends and objects set forth above, together with other advantages which are obvious and inherent to the system. It will be understood that certain features and subcombinations are of utility and may be employed without reference to other features and subcombinations. This is contemplated by, and is within the scope of, the claims.

The invention claimed is:

1. An apparatus that filters a slurry stream as the slurry stream is being loaded into a slurry tank by way of an inlet on the tank, the apparatus comprising:

a basket assembly that, in a first position, is disposed substantially within an inlet frame surrounding the inlet, the basket assembly comprising a frame and a basket, wherein, in a second position, the basket assembly is at least partially inverted; and an arm assembly that movably couples the basket assembly to the inlet frame, wherein the basket includes a lower wall a majority of which is comprised of a first set of substantially non-intersecting parallel grate members forming a plurality of apertures of a first size, triangular shaped side walls at least one of which is comprised of intersecting grate members that form a second plurality of apertures of a second size, and a rear wall comprised of intersecting grate members that form a third plurality of apertures of a third size and the first size is larger than the second size and the third size.

2. The apparatus of claim 1, wherein the lower wall includes a first portion and a second portion, the first portion comprising the first set of substantially non-intersecting parallel grate members.

3. The apparatus of claim 2, wherein the second portion of the lower wall includes the first set of substantially non-intersecting parallel grate members and another set of substantially parallel grate members, wherein the first and the another set intersect one another to form a mesh.

4. The apparatus of claim 1, wherein the arm assembly includes a pair of substantially parallel first arm members, each of which is coupled, at a first respective end thereof, to the inlet frame.

5. The apparatus of claim 4, wherein the arm assembly further includes a pair of elbow members, each of which is coupled, at a first respective end thereof, to a second end of a first arm member.

6. The apparatus of claim 5, wherein the arm assembly further includes a pair of second arm members, each of which is coupled, at a first respective end thereof, to a second end of an elbow member.

7. A slurry application system that spreads slurry onto a surface, the system comprising:

a slurry tank that is configured to store slurry, wherein the slurry tank includes an inlet frame surrounding an inlet opening, wherein the slurry tank is loaded by receiving slurry by way of the inlet;

a filter apparatus that removes foreign material from the slurry, wherein the filter apparatus includes a basket assembly that is movably coupled to the input frame by an arm assembly, the basket assembly comprising a frame and a basket, wherein the basket is movable from a first position to a second position and when the basket is in the second position the basket is at least partially inverted; and a transportation system that allows for transporting the slurry tank, wherein the basket includes a lower wall a majority of which is comprised of a first set of substantially non-intersecting parallel grate members forming a plurality of apertures of a first size, triangular shaped side walls at least one of which is comprised of intersecting grate members that form a second plurality of apertures of a second size, and a rear wall comprised of intersecting grate members that form a third plurality of apertures of a third size and the first size is larger than the second size and the third size.

8. An apparatus that filters a slurry stream as the slurry stream is being pumped into a slurry tank having an inlet, the apparatus comprising:

a basket assembly that, in a first position, is disposed substantially within an inlet frame surrounding the inlet, the basket assembly comprising a frame and a basket, wherein the basket includes a rear wall, two side walls, and a lower wall, wherein, in a second position, the basket assembly is at least partially inverted; and an arm assembly that movably couples the basket assembly to the inlet frame, wherein the basket includes a lower wall a majority of which is comprised of a first set of substantially parallel non-intersecting grate members forming a plurality of apertures of a first size, triangular shaped side walls at least one of which is comprised of intersecting grate members that form a second plurality of apertures of a second size, and a rear wall comprised of intersecting grate members that form a third plurality of apertures of a third size and the first size is larger than the second size and the third size.

9. The apparatus of claim 1, wherein the arm assembly is between the basket assembly and the inlet frame.

10. The apparatus of claim 9, wherein the arm assembly includes a first arm attached to the inlet frame, a second arm attached to the basket assembly, and an elbow member pivotally connecting the first arm to the second arm.

11. The apparatus of claim 10, wherein the elbow member includes a first end pivotally connected to one of the first arm and the second arm and a second end fixedly attached to the other of the first arm and the second arm.

12. The apparatus of claim 11, further comprising:

an actuator configured to rotate the second arm with respect to the first arm.

13. The apparatus of claim 12, wherein the actuator is a hydraulic cylinder.

14. The apparatus of claim 7, wherein the arm assembly is between the basket assembly and the inlet frame.

15. The apparatus of claim 8, wherein the arm assembly is between the basket assembly and the inlet frame.

16. The apparatus of claim 1, wherein the arm assembly is configured to rotate the basket assembly out of the inlet frame.

17. The apparatus of claim 16, wherein the arm assembly includes a first arm connected to the inlet frame, a second arm connected to the basket assembly, and an elbow rotatably connecting the first arm to the second arm.

18. The apparatus of claim 16, further comprising:

an actuator coupled to the second arm and configured to operate the arm assembly to rotate the basket assembly out of the inlet frame.

* * * * *